United States Patent [19]
Dupuy, Sr.

[11] 3,866,871
[45] Feb. 18, 1975

[54] PIPE HANGER
[76] Inventor: Robert S. Dupuy, Sr., 2909 Tournefort St., Chalmette, La. 70043
[22] Filed: Jan. 31, 1973
[21] Appl. No.: 328,266

[52] U.S. Cl. .................................. 248/59, 248/68 R
[51] Int. Cl. ............................................... F16l 3/22
[58] Field of Search ............ 248/59, 62, 74 R, 68 R, 248/68 CB

[56] References Cited
UNITED STATES PATENTS

| | | | |
|---|---|---|---|
| 247,361 | 9/1881 | Kane .................................... | 248/59 |
| 1,579,418 | 4/1926 | Tomkinson ........................... | 249/59 |
| 2,231,462 | 2/1941 | Cobb .................................... | 248/68 R X |
| 2,596,020 | 5/1952 | Fletcher et al. ..................... | 248/68 R X |
| 2,613,900 | 10/1952 | Byrnie .................................. | 248/68 R |
| 2,843,363 | 7/1958 | Mailander ............................. | 248/68 R X |
| 3,023,989 | 3/1962 | White ................................... | 248/68 CB |
| 3,414,220 | 12/1968 | Walker ................................. | 248/68 CB |
| 3,489,847 | 1/1970 | Netzel .................................. | 248/68 CB X |
| 3,556,447 | 1/1971 | Jenkins et al. ...................... | 248/68 R X |

Primary Examiner—James T. McCall
Assistant Examiner—Rodney H. Bonck
Attorney, Agent, or Firm—Bailey & Dority

[57] ABSTRACT

A pipe hanger for carrying a plurality of spaced pipes upon a single hanger, reducing parts and labor, is provided by positioning a pair of elongated aligned opposed elements each having a leg, and a web at substantially a right angle thereto, said legs carrying spaced opposed complementary pipe receiving portions, and a spacer disposed centrally of the elongated aligned opposed elements for receiving the hanger resulting in an assembly wherein the pipes are held in a vise-like grip between the pair of elongated aligned opposed elements.

1 Claim, 2 Drawing Figures

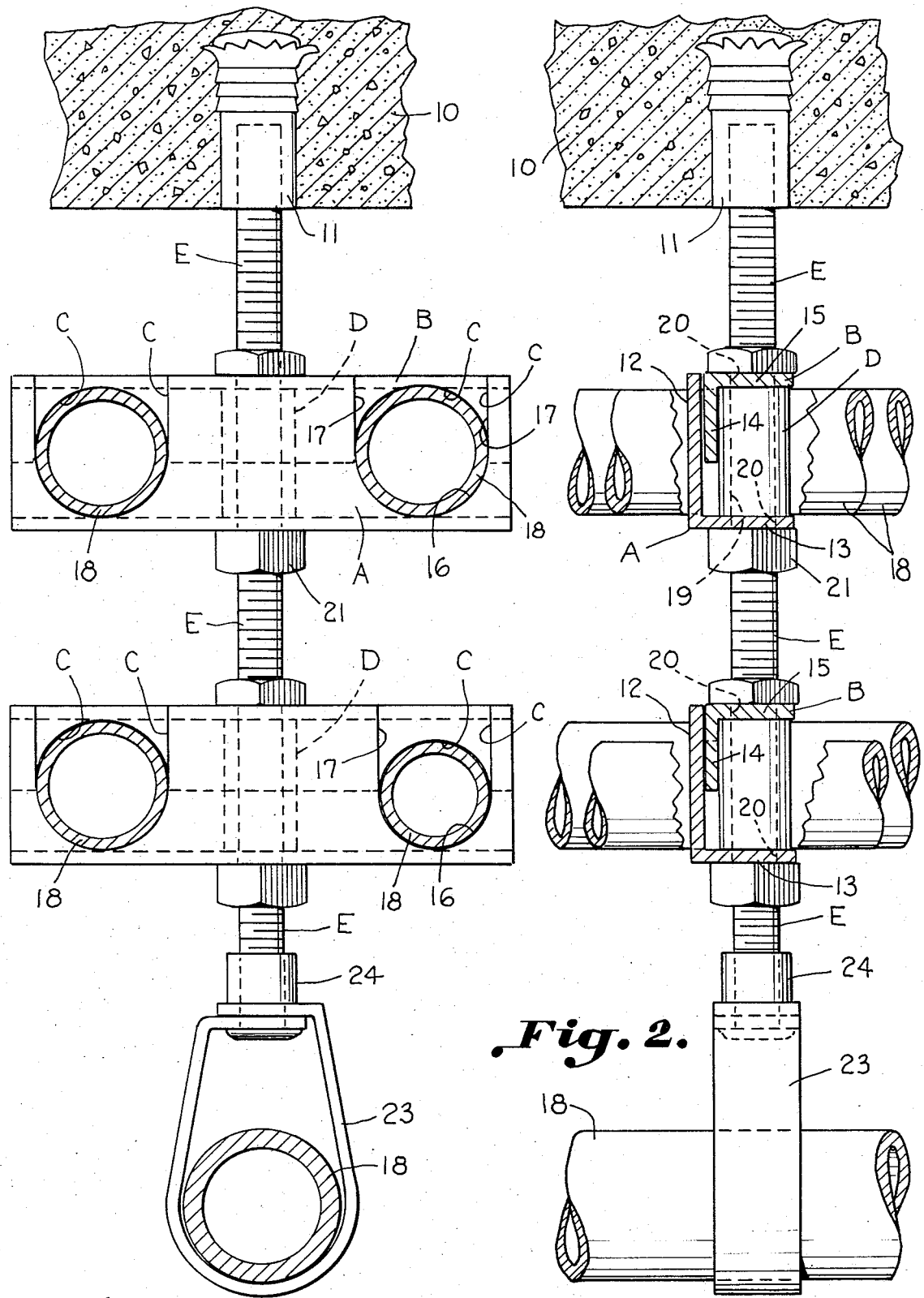

3,866,871

PIPE HANGER

This invention relates to a pipe hanger the use of which results in reduced material and labor costs together with space saving by suspending gripping means for receiving a plurality of aligned pipes or conduits upon a single hanger.

BACKGROUND OF THE INVENTION

The conventional practice for suspending pipes includes the suspension of individual stirrups or slings each having a single hanger. Such results in the necessity of leveling each pipe or, if space limitations require, suspending a number of pipes vertically, hanger after hanger. In many installations pipes are spread over a relatively large area causing painters and other artisans to set up on a number of working locations. Since a number of individual hangers are required for supporting each stirrup inventory is large requiring considerable storage space with the accompanying difficulties of transporting and assimilating the various components. An arrangement for supporting a plurality of spaced pipes upon a single hanger forming a part of a pneumatic dispatch system is noted in U.S. Pat. No. 2,003,159 wherein opposed clamps having complementary pipe receiving portions are suspended from a double hanger arrangement, one hanger being disposed on each side of the clamps. Such an arrangement has the disadvantage of requiring a number of hangers with fastening means for each in addition to intermediate fastening means.

BRIEF DESCRIPTION OF THE INVENTION

It is an important object of the present invention to overcome or at least minimize many of the difficulties set forth above. It has been found that this may be accomplished by providing a pair of opposed elongated elements preferrably in the form of angle irons with the legs overlapping and carrying therein a plurality of spaced complementary pipe receiving portions together with the provision of the spacer for maintaining the web, with sufficient spacing so that the pipes may be received and confined within the pipe receiving portions and so that a hanger with suitable fastening means may carry the assembled parts in a desired building location.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

BRIEF DESCRIPTION OF THE DRAWING

FIG. 1 is a front elevation illustrating a pipe hanger constructed in accordance with the present invention suspended from a concrete ceiling or beam, and FIG. 2 is a side elevation, with parts broken away, further illustrating the pipe hanger constructed in accordance with the present invention.

DESCRIPTION OF A PREFERRED EMBODIMENT

The drawing illustrates a pipe hanger including a pair of elongated aligned opposed elements A and B each having a leg and a web at substantially a right angle thereto. A plurality of spaced pipe receiving portions C are carried in each leg. The pipe receiving portions of one leg are in alignment with complementary pipe receiving portions of the other leg in opposed pipe receiving relation thereto. A single spacer D has a longitudinal opening therein, and is positioned between opposed webs. Each of the webs has an opening therein aligned with the longitudinal opening in the spacer. A hanger E passes through the opening in each of the webs and through the longitudinal opening in the spacer. Suitable fastening means retain the opposed elements and spacer for mounting on such hanger as a unitary assembly. Thus, a plurality of spaced pipes may be received and retained in respective pipe receiving portions and carried upon a single hanger. Preferably, the hanger and the fastening means are threaded, said legs are overlapping and the spacer positioned centrally of the elongated elements A and B with a single pair of complementary pipe receiving portions carried on each side thereof. Additional such elongated aligned opposed elements with additional such spacers may be mounted upon the hanger.

A concrete ceiling is designated at 10 and a deformable retaining element 11 has been placed therein for threadably receiving a pipe hanger with elongated elements A supplied in the form of an angle iron having a vertical leg 12 and a horizontal web 13. The elongated element B has a vertical leg 14 and a horizontal web 15.

The spacer pipe receiving portions C are carried in respective legs and generally may include a portion 16, curved or of any other configuration to accomodate the pipe, at the termination of parallel sides 17. The pipe receiving portions of one leg are in alignment with similar complementary pipe receiving portions of the other leg so as to receive a pipe or conduit 18 in a vise-like grip achieved through the overlapping legs which form a guillotine pipe receiving support. The pipes 18 may be conduits or pipes of any shape and construction of any conventional material such as metal or plastic.

The spacer D may be in the form of a short section of pipe for maintaining the webs 13 and 15 so spaced as to achieve a desired pipe receiving support from the complementary pipe receiving portions carried by the legs 12 and 14. The spacer has an axial bore or opening 19 therein. The opening 19 is aligned with the complementary opening 10 in each of the webs 13 and 15 so as to arrange the spacer centrally of the elongated opposed elements A and B.

The hanger E passes through the opening in each of the webs and through the longitudinal opening in the spacer. Suitable fastening means in the form of nuts 21 and 22 are provided for assembling foregoing parts as described above and for positioning the elements A and B at a desired level to fix the level of the pipes or conduits retained therein.

The drawing illustrates a succeeding assembly including additional elongated aligned elements A and B with an additional spacer and associated parts. Suspended from this is a conventional pipe hanger which includes a stirrup or hanger element 23 together with a suitable fastening 24.

It is to be understood that the assembly referred to above may be carried by extending the hanger E horizontally from a vertical wall so that the pipes would be arranged vertically if required. Any such arrangement may be achieved and any number of elements provided for carrying any desired number of pipes may be provided.

While a preferred embodiment of the invention has been described using specific terms, such description is for illustrative purposes only, and it is to be understood that changes and variations may be made without departing from the spirit or scope of the following claims.

What is claimed is:

1. A pipe hanger comprising:
   A. a pair of elongated aligned opposed L-shaped elements each having a leg and a web at substantially a right angle to said leg;
   B. a plurality of spaced pipe receiving portions carried in each leg;
   C. said pipe receiving portions of one leg being in alignment with complementary pipe receiving portions of the other leg in opposed pipe receiving relation thereto with said legs overlapping in gripping engagement with said pipes;
   D. a single spacer having a longitudinal opening therein positioned between opposed webs;
   E. each of said webs having an opening therein aligned with said longitudinal opening in said spacer;
   F. an elongated threaded hanger passing through said opening in each of said webs and through said longitudinal opening in said spacer;
   G. a threaded fastening means threadably carried on said elongated hanger on each side of said opposed webs retaining said opposed elements and spacer for exerting a gripping force on said pipes and for adjustably mounting on said hanger as a unitary assembly;
   I. said spacer is positioned centrally of said elongated elements with complementary pipe receiving portions carried on each side thereof; and
   J. a second pair of such elongated aligned opposed elements with an additional such spacer adjustably mounted upon said hanger with threaded fastening means on each side thereof;
   whereby a plurality of spaced pipes may be received and retained in respective pipe receiving portions and carried upon a single hanger.

* * * * *